United States Patent [19]

McCormack

[11] Patent Number: 5,346,547
[45] Date of Patent: Sep. 13, 1994

[54] METHOD OF MAKING CONCRETE ELECTRICALLY CONDUCTIVE FOR ELECTROMAGNETIC SHIELDING PURPOSES

[75] Inventor: Ray G. McCormack, St. Joseph, Ill.

[73] Assignee: The United States of America as represented by the Secretary of the Army, Washington, D.C.

[21] Appl. No.: 880,442

[22] Filed: May 8, 1992

[51] Int. Cl.$^5$ ............................................. C04B 14/48
[52] U.S. Cl. .................................. 106/644; 106/643; 106/723; 106/746; 252/500; 252/518; 252/519; 428/929
[58] Field of Search ............... 106/644, 723, 643, 746, 106/14.05; 252/500, 518, 519; 428/929

[56] References Cited

U.S. PATENT DOCUMENTS

| | | | |
|---|---|---|---|
| 4,023,706 | 5/1977 | Dearlove et al. | 106/644 |
| 4,062,913 | 12/1977 | Miller et al. | 106/644 |
| 4,121,943 | 10/1978 | Akazawa et al. | 106/644 |
| 4,159,911 | 7/1979 | Takazuka | 106/644 |
| 4,209,338 | 6/1980 | Magnus | 106/644 |
| 4,298,660 | 11/1981 | Nakagawa | 106/644 |
| 4,615,280 | 10/1986 | Shoop et al. | 106/644 |
| 4,804,585 | 2/1989 | Tani et al. | 106/644 |
| 4,883,713 | 11/1989 | Destree et al. | 106/644 |
| 4,979,992 | 12/1990 | Bache | 106/644 |

*Primary Examiner*—Anthony Green

[57] ABSTRACT

Method and apparatus for making electrically conductive concrete articles used for electromagnetic shielding, the invention also includes the articles of manufacture formed according to the method. Concrete articles formed according to the method of the invention are reinforced with magnetized metallic fibers, preferably steel fibers, a substantial portion of the fibers contacting nearby fibers to provide electrical continuity through the article. Contact between fibers is enhanced according to the invention by vibration of the concrete/fiber mix during forming of the electrically conductive concrete article.

15 Claims, 1 Drawing Sheet

U.S. Patent  Sep. 13, 1994  5,346,547
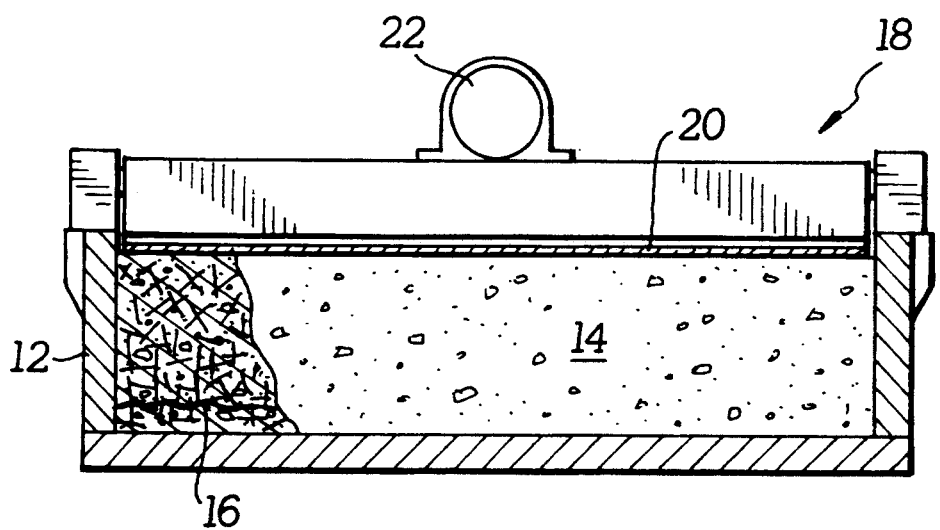

5,346,547

METHOD OF MAKING CONCRETE ELECTRICALLY CONDUCTIVE FOR ELECTROMAGNETIC SHIELDING PURPOSES

BACKGROUND OF THE INVENTION

1. Field of the Invention

The invention relates to articles useful for electromagnetic shielding and particularly to structural concrete articles having magnetized reinforcing fibers disposed within the articles wherein a substantial portion of the fibers contact nearby fibers.

2. Description of the Prior Art

Large scale electromagnetic shielding applications require economical shielding elements preferably formed from standard materials such as are used in facility construction. Since facilities are commonly formed of concrete, it is desirable that the concrete itself be made sufficiently electrically conductive to provide required electromagnetic shielding performance. The prior art includes prior attempts to render concrete electrically conductive using steel fibers. For example, Miller et al, in U.S. Pat. No. 4,062,913, orients steel fibers in concrete by means of an electrical field. Similarly, Takazuka, in U.S. Pat. No. 4,159,911, subjects steel fibers to a magnetic field during mixing with concrete with no magnetization of the fibers being developed. Steel fibers have further been mixed in concrete by Dearlove et al, as described in U.S. Pat. No. 4,023,706, and by Akazawa et al, in U.S. Pat. No. 4,121,943. Tani et al, in U.S. Pat. No. 4,804,585, describe the use of steel fibers for simple reinforcement of concrete. Tani et al, as well as Bache in U.S. Pat. No. 4,979,992, provide one of many examples wherein steel fibers are used for reinforcement of concrete but without the capability of providing electromagnetic shielding in the resulting concrete structure. In U.S. Pat. No. 4,615,280, Shoop et al describe a concrete housing for electronic components formed of steel fiber reinforced concrete. As with Tani et al and Bache, the concrete structure is intended to be strengthened by the steel fibers but do not provide an electromagnetic shielding capability of any substantial utility. Accordingly, prior use of steel fibers in concrete has not resulted in concrete articles having substantial electromagnetic shielding effectiveness.

The present invention relates to the reinforcement of concrete articles through the use of metallic fibers and particularly magnetized steel fibers with the resulting concrete articles exhibiting very substantial electromagnetic shielding capability. According to one teaching of the invention, fiber to fiber contact is intended to be continuous at least through substantial portions of the volume of the concrete, this fiber to fiber contact being preferably effected by vibration of the fiber/concrete mix during setting in a form. The present invention thus provides methodology, apparatus and articles of manufacture which provide substantial electromagnetic shielding capability to concrete structures.

SUMMARY OF THE INVENTION

The invention provides methodology, apparatus and articles of manufacture which relate to electromagnetic shielding through use of electrically conductive concrete. The methodology of the invention relates to the use of magnetized electrically conductive fibers, particularly steel fibers, which reinforce concrete articles and render the concrete articles electrically conductive by disposing the fibers in contact with each other within the concrete itself, thereby assuring electrical continuity throughout the concrete. The invention further provides a particular method for effecting contact between the magnetized steel fibers within the concrete, the fiber/concrete mix being vibrated according to the invention while the mix is present in a plastic state in concrete forms.

The apparatus of the invention provides means for vibrating a mixture of magnetized steel fibers and concrete while the fiber/concrete mix is present in concrete forms, vibration of the fiber/concrete mix acting to assure contact of at least a substantial portion of the fibers with nearby fibers to provide electrical continuity throughout the concrete on setting of said concrete.

The invention further contemplates the articles of manufacture formed according to the methodology of the invention, the concrete articles being structural and also providing substantial electromagnetic shielding levels such that the concrete articles can be used in the construction of facilities which are to be shielded from electromagnetic interference. Accordingly, the articles of the invention provide low cost shielding of a facility through the use of standard materials used in construction of such facilities.

Accordingly, it is an object of the invention to provide methodology for producing reinforced concrete articles capable of substantial electromagnetic shielding by disposing magnetized metallic fibers, and particularly steel fibers, within concrete and causing at least a substantial portion of the fibers to contact nearby fibers, such as through vibration of a mixture of the fibers and concrete after pouring of the fiber/concrete into forms, contact between the fibers assuring electrical continuity throughout the concrete and thus providing electromagnetic shielding capability to the resulting concrete articles formed according to the invention.

It is another object of the invention to provide apparatus for making electrically conductive concrete useful for electromagnetic shielding, the apparatus being capable of vibrating a mixture of magnetized steel fibers and concrete in concrete setting forms thereby to cause electrical contact to occur between at least a substantial portion of the fibers and nearby fibers.

It is a further object of the invention to provide articles of manufacture formed of concrete reinforced through the use of metal fibers and particularly magnetized steel fibers such that the concrete articles are reinforced from the standpoint of strength and exhibit substantial electromagnetic shield capability by virtue of electrical contact between at least a substantial portion of the fibers with nearby fibers to provide electrical continuity throughout the concrete.

Further objects and advantages of the invention will become more readily apparent in light of the following detailed description of the preferred embodiments.

BRIEF DESCRIPTION OF THE DRAWING

The drawing is a diagrammatical illustration of a mixture of magnetized steel fibers and concrete in a concrete form in contact with a vibrating concrete screed.

DESCRIPTION OF THE PREFERRED EMBODIMENTS

Referring now to the drawing, a concrete form is seen at 12 to be filled with a mixture of concrete 14 and fibers 16 so that the mixture will set into a concrete article. The concrete 14 can take the form of any readily available concrete such as would be formed of Portland cement, water, sand, aggregate, etc. The fibers 16 can take the form of any metallic fiber which can be magnetized. The fibers 16 preferably take the form of steel fibers which are capable of magnetization. The fibers 16 are magnetized prior to mixing with the concrete 14, the mixture then being poured into the form 12. The steel fibers 16 are preferably treated prior to mixing with the concrete 14 to cause the fibers to be corrosion resistant and thereby to facilitate good electrical contact between the fibers 16 within the concrete 14.

The most general method of the invention contemplates any methodology which will cause the fibers 16 to contact at least nearby fibers within the concrete/fiber mixture. The invention particularly contemplates vibration of the form 12 after pouring of the concrete/fiber mixture into the form to cause the fibers 16 to migrate or move about within the wet concrete 14 to cause contact between said fibers 16. Since the fibers 16 are magnetized, magnetic forces then cause the fibers 16 to maintain contact with nearby fibers, unlike magnetic poles of the fibers 16 attracting to maintain said fibers 16 in contact within the fiber/concrete mixture.

Vibration of the concrete form 12 and thus the mixture of the concrete 14 and of the fibers 16 is preferably accomplished through use of a vibrating screed shown generally at 18 to include a screed element 20 and a motor 22. Vibrating screeds are known in the art and any such screed can be selected with vibratory motion being imparted directly to the form 12 or to the concrete 14 through use of a suitable vibrating screed element such as the screed element 20. In addition, a vibrator may be attached to the vertical forms used for pouring walls.

Contact between the magnetized steel fibers 16 within the concrete 14 causes the resulting concrete article on setting to be sufficiently conductive electrically to provide substantial electromagnetic shielding. Use of the concrete article so formed to construct facilities can be accomplished by providing appropriate seams between separate sections formed of the shielding articles of the invention and by treating all penetrations according to conventional practices. Mixing of the fibers 16 with the concrete 14 can be accomplished by sifting of the fibers into a concrete mixer (not shown) after the cement, water, sand, aggregate, etc. have been mixed within the mixer. The mixture of the concrete 14 and of the fibers 16 is then poured into the form 12 in a conventional manner. Selection of an appropriate aggregate including sand can increase the mobility of the fibers 16 during vibration of the form 12.

The invention can be practiced other than as explicitly described hereinabove as can be readily envisioned from the foregoing description. The invention thus is intended to attain a scope consistent with the recitations of the appended claims.

What is claimed is:

1. A method for making electrically conductive articles having substantial electromagnetic shielding capability, consisting essentially of:
    forming a settable mixture of concrete and magnetized metallic fibers; and,
    orienting the fibers randomly, yielding electrical contact between at least a substantial portion of the fibers and adjacent fibers to produce substantial electrical continuity through the concrete and fiber mixture.
2. The method of claim 1 wherein the fibers are formed of magnetizable steel.
3. The method of claim 1 wherein orienting consists essentially of vibrating the mixture of concrete and fibers.
4. The method of claim 3 wherein the fibers are formed of magnetizable steel.
5. The method of claim 4 and further consisting essentially of treating the fibers to enhance resistance to corrosion prior to mixing the fibers with the concrete.
6. The method of claim 4 and further consisting essentially of pouring the mixture into a form after forming the settable mixture.
7. The method of claim 6 wherein vibrating the mixture of concrete and fibers consists essentially of vibrating the form.
8. The method of claim 1 and further consisting essentially of allowing the settable mixture to set.
9. Apparatus for making electrically conductive concrete articles having substantial electromagnetic shielding capability consisting essentially of:
    means for containing a mixture of concrete and magnetized metallic fibers; and,
    means contacting the containing means for vibrating said containing means and the mixture of the concrete and of the magnetized metallic fibers contained therein to effect electrical contact between at least a substantial portion of the fibers and adjacent fibers to produce substantial electrical continuity through the concrete and fiber mixture.
10. The apparatus of claim 9 wherein the fibers are formed of magnetizable steel.
11. The apparatus of claim 10 wherein the containing means consists essentially of a concrete form.
12. The apparatus of claim 11 wherein the vibrating means consists essentially of a vibrating screed.
13. An article of manufacture having substantial electromagnetic shielding capability consisting essentially of a formed concrete material within which magnetized metallic fibers are dispersed with at least substantial portions of the fibers electrically contacting adjacent fibers to produce substantial electrical continuity from the article.
14. The article of claim 13 wherein the fibers are formed of magnetizable steel.
15. The article of claim 14 wherein the fibers are corrosion resistant.

* * * * *